3,265,548
PROCESSES FOR PREPARING DECORATIVE
SURFACE COVERINGS
Joseph C. Harkins, Jr., Kennett Square, and Frank E. Ehrenfeld, Jr., Brookhaven, Pa., and Robert J. Eitzel, Wilmington, Del., assignors to Congoleum-Nairn Inc., Kearny, N.J., a corporation of New York
Filed Oct. 29, 1963, Ser. No. 319,879
7 Claims. (Cl. 156—79)

This invention relates to flexible, composition surface coverings and particularly to plastic surface coverings having a wear layer containing decorative chips and particularly to processes for preparing such surface coverings.

In accordance with present commercial practice, plastic surface coverings comprise synthetic or natural thermoplastic resinous binders, pigments, stabilizers, fillers and the like. They are prepared in sheet or tile form and widely used as coverings for floors, walls, counter tops, vehicle interiors and the like. Such products usually range in thickness from about 0.015 inch to 0.125 inch and are often secured to backings of felted-fibrous sheets impregnated with water-resistant, strengthening impregnants.

Vinyl resins are most commonly employed as the resin in the binder of plastic surface coverings. Polyvinyl chloride, including its copolymers and terpolymers, and particularly polyvinyl chloride copolymerized with vinyl acetate, are used in the greatest quantities. Plasticizers are normally added to the resin to make up the binder to give flexibility to the composition. Conventionally, the composition is prepared by mixing all of the ingredients of the composition under conditions of high heat and pressure in a mixing device such as a Banbury mixer. During the mixing the thermoplastic resin is solvated and fused by the plasticizer to form the binder which holds the fillers and pigments in a homogeneous composition. After mixing, the composition is formed into a sheet by passing it through heated calender rolls. The calender rolls are usually heated to between 200 to 350° F., which is above the softening temperatures of the composition. A solid colored sheet is obtained in this manner, which, after cooling, is suitable for use as a surface covering.

Most products of the type produced, however, have a variegated appearance and, therefore, are more decorative and pleasing to the eye. Variegated sheets are obtained by comminuting a number of differently colored plain sheets and mixing the discrete granules so obtained in the desired relative color proportions. The mixture, while heated to a plastic and moldable consistence, is consolidated by one or more calendering operations at the aforementioned elevated temperatures. In the calendering, the individual granules largely retain their individual colors, but are subject to substantial distortional commingling. This distortion commingling is evidenced in the product of the first calendering by the fact that the granules have become distorted into long streaks to provide a striated effect that is commonly known as "jaspe." In addition to the jaspe effect, a simulated marble effect can be produced by further distortional commingling of the granules of different color. This is usually accomplished by the so-called cross-calendering technique. By this method, jaspe sheets prepared as described above are cut at intervals, turned 90 degrees, placed in overlapping relationship and fed to a second calender operation. This second calendering breaks up the streaks to form a decoration simulating the graining in marble. This process is more fully described in U.S. Patent 2,917,781, issued December 22, 1959, to Robert K. Petry.

Variegated color effects likewise have been produced by initially forming by passage between rolls a sheet having substantially uniform color throughout and prior to further formation of the finished sheet by passage between additional rolls adding pieces of contrasting color which may be of the character aforesaid, so that, upon being subjected to calendering with the initially formed sheet, they become embedded in the composition sheet. Such products usually depend on the hardness of the decorative pieces and the plasticity of the sheet to become embedded in the sheet with only limited distortion. Such a procedure is disclosed in U.S. Patent 2,888,975, issued June 2, 1959, to Walter E. Benedict.

These calendering operations produce products having at least some degree of directional characteristics. By directional characteristics, it is meant that it is readily apparent by an unskilled eye which direction the product was calendered since the decoration is more or less distorted in the direction of calendering. Many attempts have been made to produce overall, non-directional decorations by means of continuous calendering equipment. Completely non-directional decorations have only been obtained by pressing and molding operations whereby granules of resinous compositions are spread in a press and forced into a compact, uniform sheet by pressure exerted in one direction on the surface of the granules. In such a system, under suitable conditions and temperature, the particles remain substantially undistorted in shape. These products are commonly referred to as having a terrazzo type decoration in that they are composed of distinct, non-directional areas of contrasting coloration. Such intermittent molding operations are substantially slower than the continuous calendering system and, therefore, the product produced has a premium price.

An object of the invention is to produce a flexible, smooth surface covering of plastic composition having an overall, non-directional decoration in a simple and economical manner. Another object of the invention is to provide a process for producing such a product capable of adaptation to continuous high speed operations. A further object is to provide a process for producing a plastic composition sheet composed of synthetic resinous composition having unique structural characteristics and an exceptionally smooth and attractive decorative appearance. Other objects of the invention relative to the provision of an improved method for making a plastic composition sheet of synthetic resinous composition having areas of contrasting color whereby sharply defined, predetermined boundaries between the areas of different color are produced. Additional objects and the advantages of the invention will be apparent from the following description.

In accordance with the invention, a flexible, smooth surface floor covering having an overall, non-directional decoration is produced by depositing on a web a uniform layer of a liquid resinous composition, depositing on the liquid coating, colored granules of compatible resinous plastic composition, heating the coating and granules to fuse the composition and subjecting the heated granules to a planishing operation between rolls maintained at temperatures substantially below the fusion temperature of the temperature of the composition which exerts sufficient pressure to smooth the surface of the sheet without substantially distorting the shape of the granules. The product can then be subjected to other conventional finishing operations such as embossing, cutting, or the like.

Alternately, if the web is a release paper, after cooling the sheet formed from the fused coating and chips can be stripped from the paper. The sheet can then be used as such or laminated to any desired backing. Either side of the sheet can be used as the surface. As a general rule, the smoothest surface is the side which contacted the release paper. A particularly desirable product can be obtained by laminating the stripped sheet to the surface of a foamed or foamable layer of resinous composition. This can be readily accomplished by the use of an adhesive if a prefoamed layer is used or by fusing and foaming the layer in the same operation as the chip-containing layer is fused.

In accordance with the invention, it is possible to produce an overall, non-directional decoration in plastic composition sheets by high speed coating procedures. Such a result was heretofore unobtainable, since the direct calendering of granules of plastic composition together to form a sheet would result in their elongation and/or streaking with substantially complete loss of their individual characteristics.

The invention will be better understood from the following detailed description when read in conjunction with the accompanying drawings wherein typical embodiment are set forth for the purpose of illustration.

Figures 1, 2, 3, 4:
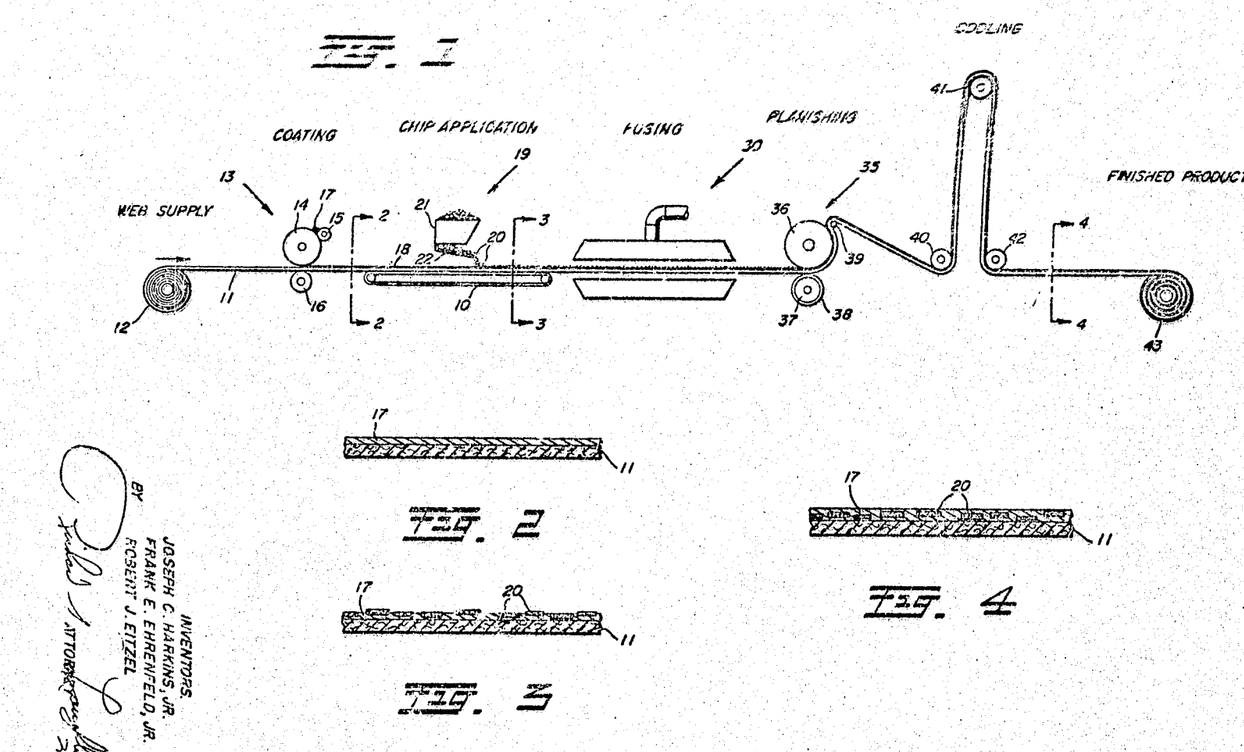
FIGURE 1 is a schematic representation which illustrates one embodiment of the invention.
FIGURE 2 is a cross-sectional view of the product at an intermediate stage taken along line 2—2 in FIGURE 1.
FIGURE 3 is a cross-sectional view of the product at an intermediate stage taken along line 3—3 in FIGURE 1.
FIGURE 4 is a cross-sectional view of the finished product.

Referring to the drawings, a web of backing material 11 is supplied from supply roll 12 and passes to a coating apparatus generally indicated at 13. The coating apparatus shown is a reverse roll coater, but any type of coating apparatus can be used. The reverse roll coater comprises an applicator roll 14, a smaller roll 15 contacting the applicator roll and a back-up roll 16 which presses the web 11 against the applicator roll 14. A liquid resinous composition 17 is fed to the nip formed by the applicator roll 14 and the small roll 15. The small roll applies a smooth coating of the resinous composition 17 on the surface of the applicator roll 14. The coating on the applicator roll is transferred to the surface of the web 11 as it contacts the applicator roll 14. The coated web 18 is passed under a feeding mechanism generally indicated at 19 which applies a uniform layer of plastic composition granules 20 to the surface of the web. The feeding mechanism can be any apparatus which is capable of applying a uniform layer of granules to the web. A vibrating feeder, such as those known as the Syntron type, which have a vibrating inclined plate over which the granules move has proven particularly effective. The feeder has a hopper 21 for holding the granules 20 allowing a uniform flow onto an inclined vibrating plate 22 which applies an even layer onto the coated web 18. The granules can be applied so that they are in spaced relation on the surface of the coated web or can be closely packed together. As a general rule, the coverage of the web by the granules should be less than 100%. The layer of granules is carried by the web to a heating device, generally indicated at 30, such as a bank of infra-red heat lamps or forced hot air, to raise the temperature of the compositions. The exact temperature to which the granules and coating are heated will depend on the particular compositions utilized, but as a general rule, a temperature of from about 325 to about 400° F. is required. The oven is generally at a higher temperature than that reached by the composition. The length of time required in the oven will depend on the rate of heat transfer but as a general rule from two to five minutes is sufficient. The heat is preferably only supplied to the upper surface to prevent the web from being heated to above its deterioration temperature.

The weight of the granules will cause them to sink into the coating. This rate will vary and depending on the time fusion takes place the granules can be at various levels. The penetration of the granules into the coating will also depend on the viscosity of the coating. If the viscosity is relatively high the granules will remain on the surface only partially submerged in the coating. Planishing will force the granules into the coating composition. In this latter procedure the surface of the granules will all be at approximately the same level. The amount of pressure applied by the planisher can be regulated to control the texture of the surface of the finished sheet.

The heated granules and coating can then be conveyed by the web to a planishing unit, generally indicated at 35. The planishing unit is made up of a large diameter hard surface roll 36 and a small rubber-covered back-up roll 37. The larger roll 36 presents a smooth, rigid surface suitable for imparting the desired finish to the composition sheet. Thus, the roll can have a chrome-finish or it can be a polished steel roll. If a surface finish of some other type, such as a matte finish or embossed surface is desired, then the surface of the roll can be appropriate for the production of such a finish. Roll 37 is provided with a surface layer 38 of yieldable, resilient material. For example, the layer 38 on the surface of the roll 37 can be about 1 inch in thickness of some material which will withstand heat. A synthetic rubber material, such as chlorodibutylene polymer or butadiene and styrene copolymer, is suitable for the purpose. Both rolls 36 and 37 preferably have means for circulating a cooling fluid therethrough to maintain their temperature. The rubber covered roll is usually maintained at about 60 to 150° F. The larger roll 36 is maintained at a temperature substantially below the temperature of the granules and will, therefore, present a relatively cold surface to the heated granules. As a general rule, it is preferred for this roll to have a temperature at least 75° F. below the fusion temperature of the composition. The pressure exerted by the top roll 36 should be just sufficient to consolidate the granules into a smooth uniform sheet without distorting their shape. The pressure applied between the rolls will depend to a great extent upon the components of the composition. The maximum pressure allowable for a particular composition can be readily determined by utilizing a small test sample. As a general rule, the pressure should be less than 600 pounds per square inch since above this pressure, the resilient-covered back-up roll will deteriorate. Pressures of from about 50 pounds to about 300 pounds per square inch have been found particularly effective. The back roll 37 is maintained at a temperature low enough to prevent damage to the felt. The sheet is preferably allowed to adhere and be carried by the larger roll for part of its revolution and then stripped from the roll by a stripping roll 39. The sheet on leaving the planishing unit is passed over cooling drums 40, 41 and 42, and wound on a collecting roll 43.

Figures 5, 6:
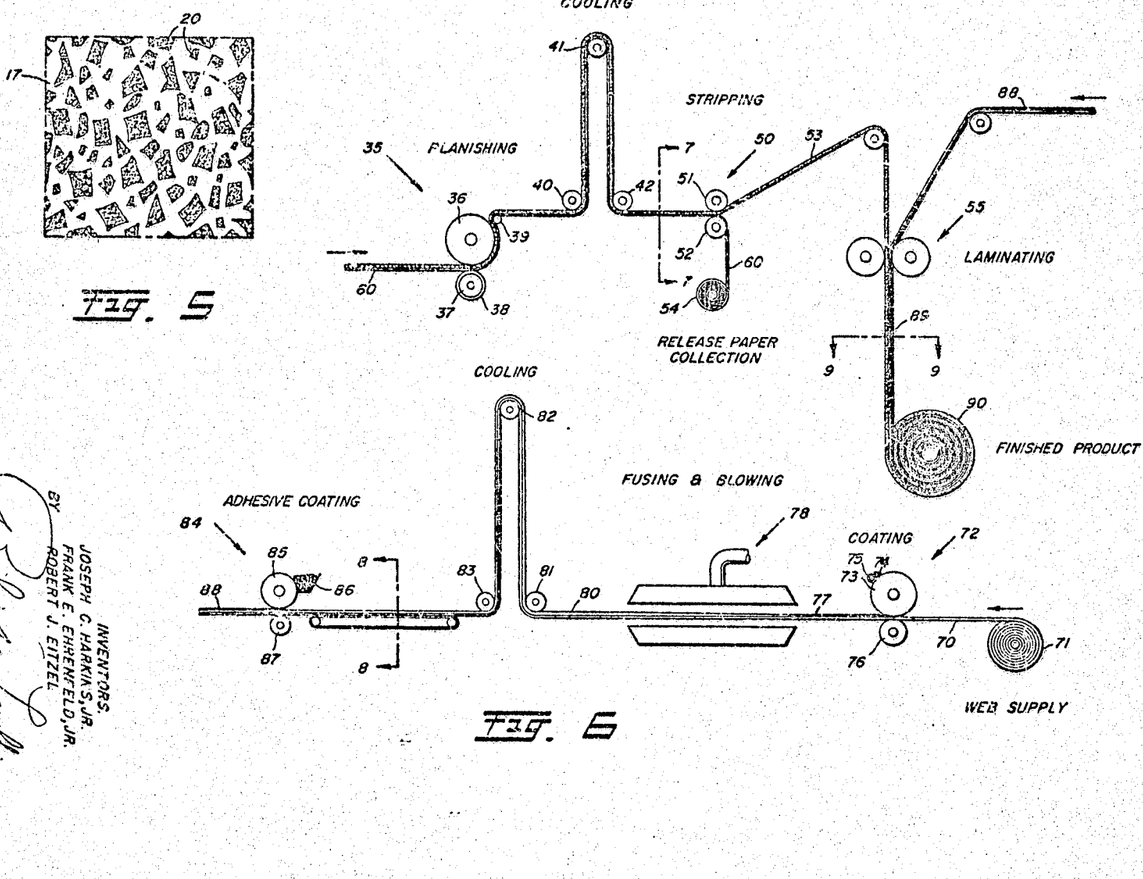
FIGURE 5 is a plan view of the finished product shown in FIGURE 4.
FIGURE 6 is a schematic representation of a second embodiment of the invention.

The product produced has a smooth decorative surface made up of the granules which are substantially undistorted in appearance. The liquid coating fills the area between the chips thereby holding the sheet together in a uniform mass.

Figure 7:
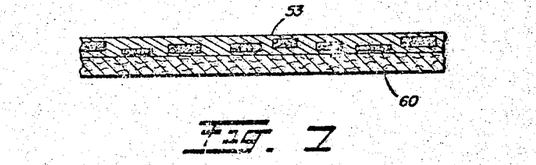
FIGURE 7 is a cross-sectional view of the product at an intermediate stage taken along line 7—7 in FIGURE 6.
Figure 8:
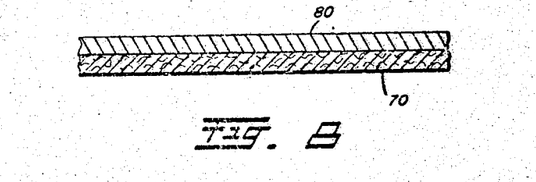
FIGURE 8 is a cross-sectional view of the product at an intermediate stage taken along line 8—8 in FIGURE 6.

An alternate method is shown in FIGURE 6 for producing a product having a vinyl composition foam intermediate layer. The steps shown in FIGURE 1 are followed, except that web 11 is a release paper 60. The fused composition is fed from the planisher generally indicated at 35 over the cooling rolls 40, 41 and 42 to a stripping apparatus, generally indicated at 50. The stripping apparatus comprises two rolls 51 and 52. The composition layer 53 comprising the granules and liquid coating is allowed to follow the top roll 51 and is fed to laminating rolls, generally indicated at 55. The release paper 60 is allowed to follow the opposite roll 52 and is thereby stripped from the back of the sheet. The release paper can be reused a number of times.

The sheet which is laminated to the composition stripped from the release paper is formed by feeding a backing web 70 from a supply roll 71 to a coating apparatus, generally indicated at 72. The coating apparatus can be any conventional coating machine capable of applying a thin coating to the surface of a moving web. A reverse roll coater is illustrated which comprises a large coating roll 73 which applies the coating composition 74 to the surface of the web 70. The composition 74 is supplied from a reservoir of the composition contained in the nip formed by the large roll 73 and a small roll 75 which presses against the large roll. The web 70 is forced against the coating roll 73 by a pressure roll 76. In this embodiment, a resinous composition is applied to the surface of the web containing a blowing agent which upon heating will decompose to form a foam structure in the coating composition 74. The coated web 77 then passes through an oven, generally indicated at 78, which heats the composition to fusion temperature and decomposes the blowing agent to form a cellular foam coating. The foamed coated web 80 is then passed over cooling rolls 81, 82 and 83. The cooled sheet passes through an adhesive coating apparatus, generally indicated at 84. The apparatus comprises a coating roll 85 which places a thin layer of adhesive on the surface of the foam sheet. The adhesive is supplied to the roll from a reservoir 86 held in contact with the roll. A small pressure roll 87 forces the foam layer 80 against the adhesive-applying roll 85. The adhesive-coated foam sheet 88 is then passed through a two-roll laminator, generally indicated at 55, where it is laminated to sheet 53. Any of the conventionally used adhesives for securing vinyl sheets together can be utilized.

Figure 9:
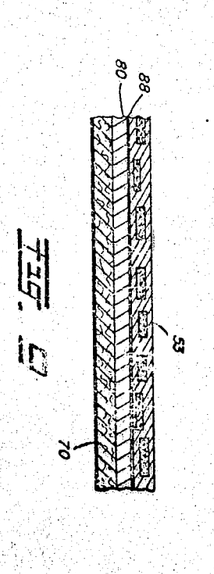
FIGURE 9 is a cross-sectional view of the finished product produced by the process illustrated in FIGURE 6.

The laminated product 89 is then wound on a collecting roll 90. As an alternate procedure, the release paper 60 can be removed after lamination to the foam layer. The product has a felt backing, an intermediate cellular foam layer and a decorative wear layer. As illustrated, the side of the decorative layer in contact with the release paper is used as the surface of the product. Alternately, the opposite side can be used as the surface of the product. Additionally, the surface can have a texture by eliminating the planishing or utilizing an engraved embossing roll instead of the conventional smooth roll of the planisher.

As indicated in another embodiment of the invention, the foamable composition can only be heated to partially fuse the composition and the sheet brought in contact with the coated web which is also only partially fused. The composite structure is then heated to fuse the compositions and decompose the blowing agent in the foamable composition. The temperature required for partial fusion will depend on the composition. As a general rule, a temperature of about 50° F. to 150° F. below the fusion temperature is adequate. Alternately the foamable composition is applied directly to the resinous layer supported on release paper and passed through an oven to decompose the blowing agent and foam the coating. Utilizing such a process it is preferable that the resinous layer be only partially fused initially and the complete fusion take place with the fusion of the foamable layer. If desired, an adhesive can then be applied to the cellulose foam layer and a flooring felt or other backing laminated to the exposed surface of the foam layer.

Another embodiment of the invention involves the formation of a product wherein the chips are oriented in closely packed, side-by-side relationship. This can be accomplished by applying a heat-activated adhesive to a backing web, and then distributing chips on the adhesive-coated web. The web is vibrated, if desired, to orient the chips. The sheet is then heated to activate the adhesive and the chips pressed to the activated adhesive. Any chips which do not adhere to the surface can be removed by inverting the sheet. A plastisol or organosol is then coated on the surface of a release paper and the wet surface brought in contact with the chip-covered sheet. The composite sheet is then heated to fuse the composition, then planished, then the release paper removed and the surface of the sheet pressed or planished to smooth the surface if desired. As a further alternate a thin transparent film can be laminated to the surface of the product. Such films can vary from less than 0.001 inch in thickness up to about 0.010 inch.

The backing sheet is preferably a flexible strong material which will remain part of the product although, as indicated, backing materials can be used which are subsequently stripped from the final product, such as strippable coated release paper or the like. A paper having a coating such as disclosed in U.S. Patent 2,273,040, which issued on Feb. 17, 1952, is particularly suitable as a release paper. If the backing remains, flexibility is important since the product is conventionally stored in closely wound rolls and must be capable of being rolled and unrolled without cracking or tearing. Strength is important in a backing in view of the strains to which the product is subjected when handled both during manufacture and immediately prior to installation.

Suitable backing sheets include those formed of flexible resinous composition as well as sheets of woven fabric and impregnated felted fibers. Any of the thermoplastic or elastomer resinous compositions which can be calendered or pressed to form a flexible sheet can be used to form backing sheets which can be used in the invention. Such resins as copolymers of butadiene and styrene, polymerized chloroprene, polyvinyl chloride, vinyl chloride-vinyl acetate copolymers, polyvinyl acetate, and the like can be compounded with plasticizers and fillers and sheeted to form a flexible sheet. In some cases, scrap and degraded resinous compositions can be salvaged by forming them into sheets which can be used as backing sheets in producing products in accordance with the invention.

As indicated, suitable backing sheets also include woven fabrics formed of such fibers as cotton, wool and various synthetic fibers. Where loosely woven fabrics such as burlap are used, the fabric can be sized to prevent passage of the printing composition through the openings between the fibers.

It has been found that felted cellulose or asbestos fibrous sheets impregnated with a water-resistant and strengthening impregnant yield desirable backing sheets for the production of products in accordance with the invention since they are low in cost and yet are flexible and strong. The sources of cellulose can include cotton or other rags, wood pulp, paper boxes or mixtures thereof in any proportion. In addition, fillers such as wood flour can be used. The felt sheet is formed from a slurry of fibrous material in water using any of the techniques conventionally employed in the manufacture of paper. For example, sheet formulation can take place on a Fourdrinier or cylinder sheet-forming machine. The fibrous sheet so prepared is then dried. In addition to cellulose and asbestos, other fibers can be used including synthetic fibers and those of mineral and animal origin.

The particular impregnant chosen must not only be capable of imparting strength and water resistance to the sheet of felted fibers, but must also meet other requirements as to its physical and chemical behavior at the processing conditions utilized. The coating composition applied to the backing in accordance with the invention must be heated to temperatures as high as 300 to 400° F. in order to fuse the resin. Thus if the impregnated backing web is part of the product at this stage the impregnant chosen must be stable at these temperatures. The impregnant should be substantially free of any components which are volatile at these temperatures and it also must not soften to such an extent as to exude from the sheet. In addition, the saturant should not be subject to appreciable detrimental chemical changes such as oxidation.

Asphalt impregnated felt can be used as a backing sheet in the invention but when it is to be subjected to high temperatures the level of impregnation is controlled not to exceed 115 percent by weight based on the weight of dry felt. The surface on which the composition is applied also bears a plurality of seal coats of paint comprising such binders as butadiene-styrene copolymer, vinylidene chloride copolymers and the like. Other impregnants which can be used in place of asphalt to impart strength and water resistance to felt are vinyl resins, such as copolymers of vinyl chloride, polymerized acrylic and methacrylic acids and their polymerized derivatives, polyethylene, polystyrene, butadiene-styrene copolymer, butadiene-acrylonitrile copolymer, natural rubber, polymerized chloroprene and the like. Thermosetting resins which under the influence of heat cure by polymerizing and crosslinking can also be used as impregnants. Such resins as phenolic resins, polyesters, oleoresins such as drying oils and the like, isocyanates and polyurethanes and the like are suitable.

Some resin impregnants which produce a felted sheet with excellent physical properties are not compatible with the resinous composition to be applied and result in poor adhesion of the composition to the felt. In such cases, it is desirable to size the surface of the impregnated felt sheet to which the composition is to be applied with a thin coating of material which has good adhesion to both the felt impregnant and the resinous composition. Where a plasticized polyvinyl chloride polymer is used, excellent results have been obtained over a wide variety of felt impregnants using a size of acrylic polymer latex. A mixture of equal parts of a soft acrylic polymer latex and a hard acrylic polymer latex has been found particularly effective in aiding adhesion, without causing sticking of the sized surface to the rolls during processing. The size coating is effective in small amounts, an application of only 0.02 pound dry weight per square yard being sufficient to obtain the improvements. Other materials can be similarly used, depending upon the type of felt impregnant and resinous composition applied thereon. A butadiene-acrylonitrile polymer latex either alone or in combination with hard acrylic resin emulsion is effective.

The resinous binder utilized for the coating compositions and granules must be one that is coalesced or fused into an elastomeric composition by the application of heat. The dispersion medium can be water in the case of an aqueous latex, an organic solvent, or a fluid plasticizer for the resin used. A dispersion of resin in a plasticizer is conventionally termed a plastisol, and a dispersion in an organic solvent an organosol. Plastisols and organosols have appreciable fluidity at normal room temperature but are converted by heat into a flexible, tough thermoplastic mass. This ultimate result is brought about by the process of fusion wherein the resin becomes plasticized and completely solvated by the plasticizer. Plastisols are preferred for the foamable composition since it is unnecessary to remove the carrier as is necessary with water and organic solvent carriers. The use of organosols is usually limited to the application of a thin layer of about 4 to 5 mils in thickness. If a thicker layer is required successive organosol layers are usually applied.

The preferred and most widely used resins for surface coverings are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than 40 percent of the extraneous comonomer is copolymerized therein. Suitable extraneous co-monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichlorethylene and the like; vinyl ethers such as vinyl ethyl ether, vinyl isopropyl ether, vinyl chlorethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethyenically unsaturated compounds such as butadiene, isoprene, chloroprene, 2,3-dimethylbutadiene-1,3, piperylene, divinyl ketone and the like.

Resins adaptable for use in formulating vinyl plastisols are commonly referred to as dispersion grade resins. Such resins are available having particle sizes of from 0.02 to about 2 microns in contrast to calender grade vinyl resins which are available in particles ranging up to 35 microns in size. Dispersion grade resins are usually of higher molecular weight than calender grade resins and have particle surfaces of a hard, horny nature.

Polymers of vinyl chloride having specific viscosities above about 0.17 and preferably between 0.17 and 0.31 as measured in a solution of 0.2 gram of resin in 100 milliliters of nitrobenzene at 20° C. are particularly effective. In the determination of specific viscosities, the sample of resin in nitrobenzene solutions maintained at a temperature of 20° C. is allowed to flow between two calibrated marks in a pipette and time required is recorded. This time is compared with the time required for a control of pure nitrobenzene solvent to pass between the same two marks, also at a temperature of 20° C. The specific viscosity is determined as the sample flow time divided by the control flow time, minus 1. The specific viscosity is an effective measure of relative molecular weight of the polymer, the higher the specific viscosity the higher being the molecular weight.

In the formulation of coating composition for use in the invention, the resin is uniformly dispersed in a mass of fluid plasticizer in a plastisol or with plasticizer and organic solvent with an organosol. The fluidity of plastisols is influenced in part by the particular resin selected but is also a function of the ratio of plasticizer to resin. Plastisols become less fluid as the ratio of plasticizer to resin is reduced. Coating compositions for use in the invention contain from about 40 to about 150 parts plasticizer per 100 parts resin with a range of about 40 to about 100 parts plasticizer per 100 parts resin being particularly effective. With organosols, the plasticizer level can be as low as 20 per 100 parts of resin up to about 55 parts with 30 to 40 parts of plasticizer per 100 parts of resin being preferred. The viscosity of the compositions can be reduced by the addition of a volatile diluent. Plastisols usually contain less than 10 parts of diluent per 100 parts resin. Useful diluents include benzene, toluene, methyl ethylketone, petroleum solvents such as V.M. and P. Naphtha (boiling range of 190–275° F.) and the like. Suitable coating compositions have a viscosity at 25° C. of from about 200 to about 25,000 centipoises as measured with a Brookfield RVF viscometer using a No. 3 spindle at 2 r.p.m.

The selection of the plasticizer is important in determining the strength and flexibility of the coating and also in influencing the viscosity, stain resistance and the foaming characteristics of the composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di (2-ethylhexanoate), diethylene glycol dipelargonate, triethylene glycol dicarprylate and the like. Plasticizers of the aromatic type, such as esters of aliphatic alcohols and aromatic alcohols and aliphatic acids or aromatic alcohols and aromatic acids are desirable. The use of highly aromatic plasticizers is limited by their tendency to yield plastisols of high viscosity. Typical plasticizers of this type include dibutyl phthalate, dicarpryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinate paraffine high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to fuse the resin. A vapor pressure of two millimeters of mercury or less at 400° F. is satisfactory.

Minor amounts of stabilizers are usually incorporated in the coating compositions to reduce the effects of degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium and the like, glycerine, leucine, alanine, o- and p-amino benzoic and sulfanilic acids, hexamethylene tetramine, weak acid radicals including oleates, recinoleates, abietates, salicylates and the like. Normally, the compositions contain about 0.5 to about 5 parts stabilizer per 100 parts resin.

The compositions can be transparent or contain pigments in accordance with the particular color desired. Any of the organic and inorganic pigments well-konwn in the art for pigmenting compositions can be used. Normally, from about 0.5 to about 6 parts pigments per 100 parts resin are used.

The foamable compositions contain, in addition to the other ingredients, an effective amount of blowing agent. The larger the amount of blowing agent within practical limits used the greater is the expansion of the foam. Foam densities of from 10 percent to 50 percent of the density of the unblown composition can be readily attained. Such results are attainable with from about 1 to about 20 parts blowing agent per 100 parts resin. About 2 to 10 parts blowing agent per 100 parts resin is particularly effective for the production of foams of a density which are most desirable for use in producing surface coverings in accordance with the invention.

Complex organic compounds which, when heated, decompose to yield an inert gas and have residues which are compatible with the resin used in the compositions are preferred as blowing agents. Such materials have the property of decomposition over a narrow temperature range which is particularly desirable for obtaining a good foam structure. Compounds having the =N—N= and —N=N— linkage decompose at elevated temperatures to yield an inert gas high in nitrogen. Typical compounds include substituted nitrose compounds, substituted hydrazides, substituted azo compounds and the like, such as are tabulated below:

| Blowing agent: | Decomposition temp. |
|---|---|
| Dinitrosopentamethylenetetramine | 355–375° F. |
| Azodiformamide (1,1' - azobisformamide) | 325–400° F. |
| p,p'-Oxybis (benzene sulfonyl hydrazide) | 300–340° F. |
| Azobisisobutyronitrile | 220–250° F. |
| N,N' - dimethyl - N,N' - dinitrosoterephthalamide | 190–300° F. |

The decomposition temperature depends in large measure on the particular composition. Catalyst can be added to aid in the decomposition and change the temperature range.

An effective amount of blowing agents for use in the invention must be decomposed at a temperature below the decomposition temperature of the resin used but above the elastomeric point of the resin composition. A layer of resinous foam has heat insulating properties with the result that fusion of a prefoamed layer is very difficult and extremely slow. Therefore, in the case of compositions formulated with the preferred vinyl chloride polymers, a blowing agent decomposing between about 300 and 450° F. should be used. The minimum initial decomposition temperature must be sufficiently high that no premature gas evolution occurs during the mixing of the composition, coating operation, and particularly the gelling step for partial fusion. In the event the coating is to be fused before the wear layer is applied, then it is necessary to use a blowing agent which decomposes above the fusion temperature of the resin. In general, vinyl chloride polymer compositions attain body through partial gellation when heated to about 200° F. Thus, the minimum decomposition temperature should be about 200° F. or higher.

The degree of foaming of a typical plastisol formulation using different concentrations of blowing agent is shown in the following table:

| Parts Azodiformamide, per 100 parts resin | Ratio of foam thickness to original thickness | Density, lbs. per cu. ft. |
|---|---|---|
| 0.0 | 1/1 | 80 |
| 0.1 | 1.33 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |
| 10.0 | 10.7/1 | 7.5 |

It has been found that density of from about 12 to 20 pounds per cubic foot produces the most useful products.

The granules or chips usually contain fillers in addition to the other components. Suitable fillers include limestone, asbestos, wood flour, talc and the like. Typical formulations comprise about 20 to about 75% resin, about 10 to about 30% plasticizer, about 5 to about 75% filler including pigment, about 1 to about 3% stabilizer and about 0.5 to about 5% lubricant. The chips can also be formed of a plastigel composition which becomes fused upon subsequent heating. Such compositions are disclosed in U.S. Patent No. 3,015,640 issued to Petry and Weaver on January 2, 1962.

The granules are homogeneous particles containing all the ingredients of the resin composition. They are conventionally prepared by mixing the various ingredients of resin, filler, pigments, a stabilizer and lubricant in a Banbury mixer at a temperature where the resin becomes solvated by the plasticizer and is soft enough to bind all the ingredients together into a homogeneous mass. The mixing is usually carried out between 275° F. and 375° F., although the largest majority of commercially available resins are usually mixed at about 290° to 350° F. The homogeneous mass is then sheeted between rolls and the sheet broken up to form the granules. The size of the granules can be varied depending on the type of decoration to be produced. The granules can vary from fine particles having a size from about 0.02 to 0.06 in diameter up to granules having a largest dimension of one inch. Even larger granules can be utilized in combination with the smaller granules. The major portion of the granules, however, should be within the range of about 0.10 to about 0.50 inch in diameter. The thickness of the granules is preferably less than the thickness of the sheet to be formed. The preferred thickness of the granules are from about 0.10 to about 0.015 inch. The granules should be at least one-half the thickness of finished sheet in order for the product to have adequate wearing qualities. Conventionally, the granules are formed from a sheet of uniform thickness so that all of the granules formed in this manner will have at least one uniform dimension.

The thickness of the liquid coating applied to the web or release paper is critical in relation to the thickness of the granules distributed over its surface in order to obtain a smooth sheet. It should be understood, however, that the granules or chips do not have to be completely embedded in the sheet. A textured surface is obtained if portion of the granules extend above the surface of the sheet from about 0.001 to about 0.005 inch. The liquid coating should have a thickness less than the thickness of the granules. The thickness of the coating, however, depends in large measure on the percentage of coverage of the coating by the granules. It is preferred to have the liquid coating less than two-thirds the thickness of the granules with less than one-half the thickness of the granules being particularly desirable.

The following examples are given for purposes of illustration:

EXAMPLE 1

|  | Parts |
|---|---|
| Polyvinyl chloride (dispersion grade) | 100 |
| Di(2-ethylhexyl) hexahydrophthalate | 50 |
| Epoxidized soya oil | 5 |
| Wetting agent | 2 |
| Stabilizer | 3 |
| Pigment | 3 |

The plastisol had a viscosity of 2,500 centipoises as measured with a Brookfield RVF viscometer using a No. 3 spindle at 2 r.p.m.

EXAMPLE 2

The following ingredients in the proportions indicated were ground on a three-roll mill:

|  | Parts |
|---|---|
| Polyvinyl chloride (dispersion grade) | 100 |
| Petroleum hydrocarbon condensate [1] | 13 |
| Butyl benzyl phthalate | 37 |
| Pigment | 3 |
| Stabilizers | 4 |

[1] Conoco 300—Continental Oil Company. The plastisol was suitable for coating.

EXAMPLE 3

|  | Parts |
|---|---|
| Polyvinyl chloride (dispersion grade high molecular weight) [1] | 50 |
| Polyvinyl chloride (dispersion grade high molecular weight) [2] | 50 |
| Petroleum hydrocarbon condensate [3] | 11 |
| Butyl benzyl phthalate | 35 |
| Pigment | 3 |
| Stabilizer | 4 |
| Wetting agent | 1 |
| Petroleum naphtha | 2 |

[1] Exon 654—Firestone Plastics Company, Pottstown, Pa. Relative viscosity of 2.65 (1% in cyclohexanone).
[2] Exon 650—Firestone Plastics Co. Relative viscosity of 2.30 (1% in cyclohexanone).
[3] Conoco H-300—Continental Oil Co., Ponca City, Okla. The plastisol was suitable for coating.

EXAMPLE 4

A transparent organosol was prepared by mixing the following ingredients:

|  | Parts |
|---|---|
| Vinyl chloride polymer (dispersion grade) | 100 |
| Dioctyl phthalate | 16 |
| Tricresyl phosphate | 8.5 |
| Stabilizer | 4.0 |
| Mineral spirits | 24 |

The organosol had a Brookfield viscosity of 8,000 (2 r.p.m.—No. 3 spindle).

EXAMPLE 5

A plastisol coating composition was prepared having the following composition:

|  | Parts |
|---|---|
| Polyvinyl chloride (dispersion grade) | 100 |
| Butyl benzyl phthalate | 43.7 |
| Alkyl aryl hydrocarbon | 4.4 |
| Barium-zinc complex | 3.5 |
| Titanium dioxide (58% finely divided $TiO_2$ in dioctyl phthalate) | 3.0 |
| Hydrocarbon diluent | 4.4 |

Stormer viscosity is 55 seconds per 100 rev. at 77° F. under 200 gm. load.

EXAMPLE 6

A transparent organosol was prepared by mixing the following ingredients:

|  | Parts |
|---|---|
| Polyvinyl chloride (dispersion grade) | 100 |
| Dioctyl phthalate | 15 |
| Tricresyl phosphate | 15 |
| Petroleum mineral spirits | 20 |
| Methylethyl ketone | 2 |
| Stabilizer | 5 |

EXAMPLE 7

A transparent organosol was prepared by mixing the following ingredients:

|  | Parts |
|---|---|
| Polyvinyl chloride (dispersion grade) | 100 |
| Dioctyl phthalate | 10 |
| Tricresyl phosphate | 7 |
| Epoxidized soya bean oil | 8.5 |
| Barium-cadmium (stabilizer) | 3 |
| Mineral spirits | 21.5 |
| Methyl ethyl ketone | 2 |

EXAMPLE 8

A foamable plastisol was formulated by grinding the following ingredients on a conventional three-roll mill:

| | Parts |
|---|---|
| Vinyl chloride-vinyl acetate copolymer (dispersion grade) | 100 |
| Dioctyl phthalate | 30 |
| Dipropylene glycol dibenzoate | 30 |
| Stabilizer | 6 |
| Finely divided titanium dioxide | 2.5 |
| Azodiformamide blowing agent | 2.5 |

The plastisol had a viscosity of 16,800 centipoises at 25° C. as measured with a Brookfield viscometer using a No. 6 spindle at 10 r.p.m.

EXAMPLE 9

The following ingredients in the proportions indicated were ground on a three-roll mill:

| | Parts |
|---|---|
| Polyvinyl chloride (dispersion grade) | 100 |
| Petroleum hydrocarbon condensate [1] | 18 |
| Butyl benzyl phthalate | 52 |
| Pigment | 3 |
| Stabilizers | 4 |
| Azodiformamide blowing agent | 3.5 |

[1] Conoco 300—Continental Oil Company, Ponca City, Okla.

The plastisol had a viscosity of 4,000 centipoises as measured with a Brookeld viscometer using a No. 6 spindle at 10 r.p.m.

EXAMPLE 10

The following ingredients were ground on a three-mill roll:

| | Parts |
|---|---|
| Polyvinyl chloride (dispersion grade) | 100 |
| Petroleum hydrocarbon condensate [1] | 18 |
| Butyl benzyl phthalate | 52 |
| Pigment | 3 |
| Stabilizers | 4 |
| Azodiformamide blowing agent | 1 |
| V. M. & P naptha (boiling range 190–250° F.) | 5 |

[1] Conoco 300—Continental Oil Company.

The plastisol had a viscosity of 2,000 centipoises as measured with a Brookeld viscometer using a No. 6 spindle at 10 r.p.m.

EXAMPLE 11

| | Parts |
|---|---|
| Polyvinyl chloride (dispersion grade) | 100 |
| Didecyl phthalate | 80 |
| Stabilizers | 5 |
| Pigment | 2 |
| Wetting agent | 3.5 |
| N,N'dimethyl-N,N'dinitroso terephthalamide blowing agent | 5 |

The plastisol was prepared on a three-roll mill.

EXAMPLE 12

The following ingredients in the proportions indicated were ground on a 3-roll mill:

| | Parts |
|---|---|
| Polyvinyl chloride (dispersion grade) | 100 |
| Didecyl phthalate | 50 |
| Didecyl adipate | 25 |
| Stabilizer | 5 |
| Pigment | 2 |
| Wetting agent | 3.5 |
| N,N' - dimethyl - N,N' - dinitroso terephthalamide blowing agent | 5 |

EXAMPLE 13

The following ingredients in the proportions indicated were ground on a three-roll mill:

| | Parts |
|---|---|
| Polyvinyl chloride (dispersion grade) | 100 |
| Petroleum hydrocarbon condensate [1] | 18 |
| Butyl benzyl phthalate | 52 |
| Pigment | 3 |
| Stabilizers | 4 |
| Azodiformamide blowing agent | 4.5 |

[1] Conoco 300—Continental Oil Company.

The plastisol had a viscosity of 4,000 centipoises as measured with a Brookfield viscometer using a No. 6 spindle at 10 r.p.m.

EXAMPLE 14

A foamable plastisol was prepared having the following composition:

| | Parts |
|---|---|
| Polyvinyl chloride (high molecular weight) | 100 |
| Polyvinyl chloride (low molecular wieght) | 100 |
| Azodiformamide blowing agent | 3 |
| Pigment | 7 |
| Dibasic lead phosphite | 7 |
| Butyl benzyl phthalate | 100 |

The plastisol had a Brookfield viscosity of 6,400 (2 r.p.m., No. 3 Spindle.)

EXAMPLE 15

A size coat is prepared having the following formulation:

| | Parts |
|---|---|
| Polyvinyl chloride latex (preplasticized) | 53 |
| Carboxy vinyl polymer (thickener 2% in water) | 35 |
| Water | 12 |
| Ammonia to raise pH to 7–8. | |

EXAMPLE 16

A transparent plastisol of the following composition was prepared:

| | Parts |
|---|---|
| Polyvinyl chloride (dispersion grade) | 100 |
| Di(2-ethylhexyl)hexahydrophthalate | 50 |
| Epoxidized soya oil | 5 |
| Wetting agent | 2 |
| Stabilizer | 3 |

The plastisol was applied as a coating 0.015 inch in thickness to the surface of a release paper. Vinyl composition granules of uniform thickness of about 0.010 inch and varying in diameter from 0.02 to 0.50 inch were evenly distributed on the surface of the wet plastisol coating to cover approximately 80% of the surface of the sheet. The vinyl composition granules had the following composition:

| | Parts |
|---|---|
| Polyvinyl chloride resin (viscosity 0.27) | 25.4 |
| Dipropylene glycol di-benzoate | 12.4 |
| Stabilizer | 1.5 |
| Stearic acid | 1.0 |
| Pigment | 1.0 |
| Limestone | 58.0 |

The granules were prepared by mixing the ingredients in a Banbury mixer at about 350° F. and then sheeting the composition between heated calender rolls to form a sheet 0.010 inch in thickness. The sheet was then broken up into the granules and the granules mixed with similar granules of contrasting coloration.

The granule-covered sheet was inverted to remove the granules which did not adhere to the liquid plastisol. The sheet was then passed through an oven heated at 400° F. with residence time in the oven of about 2.5 minutes. The heating caused the granules and coating to fuse into a substantially homogeneous sheet. The hot sheet as it passed from the oven was subjected to a planishing operation by passing between a smooth surface steel roll and a rubber-covered resilient back-up roll. The steel roll was maintained at a temperature of about 200° F. and the rubber roll at less than 150° F. The sheet was carried in contact with the steel roll for most of one revolution of the roll. The planished sheet was then stripped from the release paper and the surface in contact with the release paper laminated to a foam-layer of 0.060 inch in thickness. The foam layer was secured to an impregnated felt backing sheet. The foam-covered felt sheet has been prepared by applying a foamable composition coating of 0.012 inch in thickness on the surface of the felt sheet. The felt sheet was felted cellulosic material 0.046 inch in thickness which had been impregnated with about 10% of a polyvinyl acetate resin. The foamable composition had the following formulation:

| | Parts |
|---|---|
| Vinyl chloride-vinyl acetate polymer | 100 |
| Dioctyl phthalate | 30 |
| Dipropylene glycol dibenzoate | 30 |
| Stabilizer | 6 |
| Azodiformamide blowing agent | 2.5 |

The foamable composition was coated on the surface of the felt sheet to the thickness indicated and then passed into an oven heated at 400° F. to fuse the composition and decompose the blowing agent to foam the layer. The residence time in the oven was three minutes.

The laminated product had a smooth surface containing the decorative granules and an interlayer of foam which gave the product excellent resiliency.

EXAMPLE 17

The general method of Example 16 was followed except that the foamable composition was coated directly on the vinyl composition coating on the release paper prior to fusing the coating composition, but after heating at 400° F. for one minute to gel the coating. The sheet was then passed through the oven in the same manner as described to decompose the blowing agent and fuse the compositions in both coating compositions. The product is then cooled and the foam surface is laminated to a flooring felt impregnated with 35% asphalt with an adhesive. The adhesive comprised a mixture of 50% buna rubber and 50% wood resin (softening point 234° F.—239° F.). The procedure used for lamination was that disclosed in U.S. Patent 2,757,711 issued Aug. 7, 1956 to Petry, et al. After lamination of the felt the release paper was stripped from the surface of the product. The resulting laminate was similar to the product in Example 16 except that the surface was very smooth and on a dull sheen.

EXAMPLE 18

An asbestos felt sheet of 0.055 inch in thickness and impregnated with about 15% of a butadiene-acrylonitrile copolymer was coated on one surface with the following adhesive:

| | Parts |
|---|---|
| Plasticized acrylic resin (46% solids) | 53 |
| Clay filler | 47 |

The adhesive coating was about 0.001 inch in thickness. Granules of vinyl composition were prepared as in Example 16 having a thickness of 0.020 inch and a square configuration of about 0.25 inch in each surface dimension. The square granules were distributed on the adhesive coated surface of the felt in a layer of approximately one chip thickness. The felt sheet was vibrated to form the single layer. Approximately 90% of the surface of the sheet was covered with chips. The chip-covered sheet was then heated to tackify the adhesive and passed through pressing rolls to secure the chips to the adhesive.

A vinyl composition having the formulation of Example 1 was coated on the surface of a release paper to form a coating of 0.005 inch in thickness and then the coated paper was reversed and the wet coating brought in contact with the surface of the chip-covered sheet. The composite structure was passed through pressing rolls to force the plastisol between the chips and then through an oven heated at 400° F. for a period of 2½ minutes to fuse the composition of the coating and chips together into a substantially homogeneous sheet. The release paper was then removed and the product was ready for use as a decorative surface covering.

Any departure from the foregoing description which conforms to the invention is intended to be included within the scope of the claims.

What is claimed is:
1. A process for producing a decorative surface covering having a continuous solid surface which comprises applying a liquid vinyl chloride polymer composition to the surface of a release paper, depositing on the liquid coating decorative granules of vinyl composition having a thickness greater than the thickness of said liquid coating to cover about 10 to about 90% of the coating, heating to partially fuse the coating, applying a foamable vinyl composition containing a blowing agent to the surface of the partially fused coating, heating to fuse the compositions and decompose the blowing agent and convert the foamable composition to a cellular foam layer, cooling the product thus formed and then stripping the release paper from its surface.

2. The process of claim 1 wherein said partially fused coating is subjected to a planishing operation without substantially reducing the temperature of the sheet below its fusion temperature by passing between a hard surface roll and a rubber covered roll.

3. The process of claim 1 wherein said liquid coating has a thickness of less than about two-thirds the thickness of said granules.

4. The process of claim 1 wherein said granules have a thickness of about 0.10 to about 0.50 inch and are all of substantially uniform thickness.

5. A process for producing a decorative surface covering having a continuous solid surface which comprises applying a liquid vinyl chloride polymer composition coating to the surface of a release paper, depositing on the liquid coating decorative granules of vinyl composition having a thickness greater than the thickness of said liquid coating to cover about 10 to about 90% of the coating, heating to partially fuse the coating, applying a foamable vinyl composition containing a blowing agent to the surface of a backing web, heating the foamable composition to partially fuse the composition without decomposing the blowing agent, laminating the surface of the partially fused foamed composition to the surface of the partially fused coating containing the granules and thereafter heating to fuse the compositions and decompose the blowing agent to convert the foamable composition to a cellulose foam layer, stripping the release paper from the composite laminate and then cooling the product thus formed.

6. The process of claim 5 wherein said liquid coating has a thickness of less than about two-thirds the thickness of the granules, the thickness of the granules is about 0.10 to 0.50 inch and all of the granules have a substantially uniform thickness.

7. The process of claim 5 wherein said partially fused coating is subjected to a planishing operation without substantially reducing the temperature of the sheet below its fusion temperature by passing between a hard surface roll and a rubber-covered roll.

References Cited by the Examiner
UNITED STATES PATENTS

| | | | |
|---|---|---|---|
| 2,218,909 | 10/1940 | Gill | 117—33 |
| 2,668,787 | 2/1954 | Schramm | 117—29 |
| 2,813,052 | 12/1957 | Lancaster. | |
| 2,888,975 | 6/1959 | Benedict. | |
| 2,894,855 | 7/1959 | Wilhelm et al. | |
| 2,983,962 | 5/1961 | Merz et al. | 156—79 |
| 3,032,828 | 5/1962 | Bethe et al. | 156—78 |

EARL M. BERGERT, *Primary Examiner.*

HAROLD ANSHER, *Examiner.*

V. A. MALLARE, T. R. SAVOIE, *Assistant Examiners.*